United States Patent
Wei et al.

(10) Patent No.: US 11,323,780 B2
(45) Date of Patent: May 3, 2022

(54) SYSTEMS AND METHODS FOR DETERMINING DELAY OF A PLURALITY OF MEDIA STREAMS

(71) Applicant: Evertz Microsystems Ltd., Burlington (CA)

(72) Inventors: Jeff Wei, Richmond Hill (CA); Rakesh Patel, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 197 days.

(21) Appl. No.: 16/834,181

(22) Filed: Mar. 30, 2020

(65) Prior Publication Data

US 2020/0322693 A1 Oct. 8, 2020

Related U.S. Application Data

(60) Provisional application No. 62/829,319, filed on Apr. 4, 2019.

(51) Int. Cl.
*H04N 21/647* (2011.01)
*H04L 43/0852* (2022.01)
*H04N 21/8547* (2011.01)

(52) U.S. Cl.
CPC ... *H04N 21/64738* (2013.01); *H04L 43/0858* (2013.01); *H04N 21/64784* (2013.01); *H04N 21/8547* (2013.01)

(58) Field of Classification Search
CPC ....... H04N 21/64738; H04N 21/64784; H04N 21/8547; H04L 43/0858; H04L 12/66; H04L 1/1874
See application file for complete search history.

(56) References Cited

U.S. PATENT DOCUMENTS

| | | | |
|---|---|---|---|
| 5,602,992 | A | 2/1997 | Danneels |
| 8,184,168 | B2 | 5/2012 | Kindborg et al. |
| 8,341,662 | B1 | 12/2012 | Bassett et al. |
| 8,516,529 | B2 | 8/2013 | Lajoie et al. |
| 9,438,432 | B2 | 9/2016 | Shepherd et al. |

(Continued)

FOREIGN PATENT DOCUMENTS

| | | |
|---|---|---|
| CN | 103561212 A | 2/2014 |
| GB | 2492749 A | 1/2013 |

*Primary Examiner* — Vinncelas Louis
(74) *Attorney, Agent, or Firm* — Bereskin & Parr LLP/S.E.N.C.R.L., s.r.l.

(57) ABSTRACT

A system and method are provided for determining delay of a plurality of media streams. The system and method involve generating, at a source processor, a series of source time packets; transmitting, at the source processor, through a network, the series of source time packets as a source packet stream; generating, at a destination processor, a series of destination time packets; receiving, at the destination processor, through the network, the source packet stream; determining, at the destination processor, a transmission time for the source packet stream based on the source time data and the destination time data; and determining, at the destination processor, a relative synchronization error based on the source signature data and the destination signature data. Each source time packet includes source time data and source signature data. Each destination time packet includes destination time data and destination signature data.

24 Claims, 7 Drawing Sheets

(56) References Cited

U.S. PATENT DOCUMENTS

| | | |
|---|---|---|
| 9,571,897 B2 | 2/2017 | Shepherd et al. |
| 9,723,221 B2 | 8/2017 | Iijima et al. |
| 9,769,527 B2 | 9/2017 | Frusina et al. |
| 9,826,138 B1 | 11/2017 | McKelvie et al. |
| 9,853,822 B2 | 12/2017 | Wijnands et al. |
| 9,942,053 B2 | 4/2018 | Wijnands et al. |
| 10,218,524 B2 | 2/2019 | Wijnands et al. |
| 10,225,090 B2 | 3/2019 | Wijnands et al. |
| 10,270,962 B1 | 4/2019 | Stout |
| 10,284,912 B2 | 5/2019 | Frusina et al. |
| 10,341,672 B2 | 7/2019 | Choi et al. |
| 10,536,628 B2 | 1/2020 | Liang et al. |
| 10,630,889 B1 | 4/2020 | Stout |
| 10,764,076 B2 | 9/2020 | Wijnands et al. |
| 10,911,694 B2 | 2/2021 | Damstra et al. |
| 11,134,185 B2 | 9/2021 | Van Geel et al. |
| 2002/0044201 A1 | 4/2002 | Alexander et al. |
| 2005/0036512 A1 | 2/2005 | Loukianov |
| 2005/0094562 A1 | 5/2005 | Roy et al. |
| 2006/0156164 A1* | 7/2006 | Meyer ................... H04L 1/1874 714/749 |
| 2007/0223459 A1* | 9/2007 | Crowle ................... H04L 12/66 370/353 |
| 2008/0137541 A1 | 6/2008 | Agarwal et al. |
| 2011/0069179 A1 | 3/2011 | Bathiche et al. |
| 2012/0182397 A1 | 7/2012 | Heinzle et al. |
| 2014/0244854 A1 | 8/2014 | Patel et al. |
| 2014/0354768 A1 | 12/2014 | Mei et al. |
| 2015/0078377 A1 | 3/2015 | Wijnands et al. |
| 2015/0078378 A1 | 3/2015 | Wijnands et al. |
| 2015/0078379 A1 | 3/2015 | Wijnands et al. |
| 2015/0078380 A1 | 3/2015 | Wijnands et al. |
| 2015/0131660 A1 | 5/2015 | Shepherd et al. |
| 2015/0181309 A1 | 6/2015 | Shepherd et al. |
| 2015/0264258 A1 | 9/2015 | Bervoets et al. |
| 2015/0358537 A1 | 12/2015 | Mirza |
| 2017/0099232 A1 | 4/2017 | Shepherd et al. |
| 2018/0041696 A1 | 2/2018 | Balasubramanian et al. |
| 2019/0028774 A1 | 1/2019 | Chakra et al. |
| 2019/0028775 A1 | 1/2019 | Chakra et al. |
| 2019/0313160 A1 | 10/2019 | Stokking et al. |
| 2020/0322407 A1 | 10/2020 | Wei et al. |

* cited by examiner

SYSTEMS AND METHODS FOR DETERMINING DELAY OF A PLURALITY OF MEDIA STREAMS

CROSS-REFERENCE TO RELATED APPLICATIONS

This application claims the benefit of U.S. Provisional Application No. 62/829,319 filed on Apr. 4, 2019, which is incorporated by reference herein in its entirety.

FIELD

The described embodiments relate to determining delay of a plurality of media streams, and in particular to determining transmission times and relative synchronization errors.

BACKGROUND

Media transmission systems can route media streams from various source devices to various downstream devices. Media streams can contain video, audio, or metadata content. The metadata is often referred to as vertical ancillary data (VANC) or horizontal ancillary data (HANC). In separate elementary essence transmission systems, each of the streams is typically a separate stream, in the sense that the information for one stream is not embedded in another stream. This is in contrast to SDI transmission, in which audio and ancillary data is embedded in non-visible portions of a video signal.

Media streams can originate from different sources and may, as a result, be out of sync with one another. In some cases, media streams can originate from the same source but may still be out of sync with each other. For example, a video stream may be "running ahead" or "running behind" a corresponding audio stream, resulting in lip-sync errors. Furthermore, when media streams are transmitted over a network, the media streams can travel via different network paths, or be processed by different intermediate devices. As a result, the media streams may arrive at a downstream device at different times, resulting in further desynchronization. Accordingly, it may be desirable to determine transmission times and relative synchronization errors.

SUMMARY

In one aspect, some embodiments provide a system for determining delay of a plurality of media streams. The system includes a source processor and a destination processor. The source processor is configured to generate a series of source time packets; and transmit, through a network, the series of source time packets as a source packet stream. Each source time packet includes source time data and source signature data. The source time data corresponds to a first time when the source time packet is generated. The source signature data corresponds to characteristic features of each of the plurality of media streams. The destination processor is configured to generate a series of destination time packets; receive, through the network, the source packet stream; determine a transmission time for the source packet stream based on the source time data and the destination time data; and determine a relative synchronization error based on the source signature data and the destination signature data. Each destination time packet includes destination time data and destination signature data. The destination time data corresponds to a second time when the destination time packet is generated. The destination signature data corresponds to characteristic features of each of the plurality of media streams.

In some embodiments, the source packet stream is transmitted in-band with the plurality of media streams.

In some embodiments, the source packet stream is transmitted out-of-band from the plurality of media streams.

In some embodiments, the source time data and the destination time data is generated using PTP (Precision Time Protocol).

In some embodiments, the source processor is further configured to transmit, through the network, the plurality of media streams. The network includes at least one processing device configured to process at least one media stream of the plurality of media streams. The destination processor is further configured to receive the plurality of media streams.

In some embodiments, the source time data and the destination time data further include a clock signal.

In some embodiments, the source packet stream is transmitted synchronously.

In some embodiments, the source packet stream is transmitted asynchronously.

In some embodiments, the characteristic features include at least one of: an average luma value, an average color value, an average motion distance, and a contrast level.

In some embodiments, the characteristic features include at least one of: an envelope of signal amplitude, an average loudness level, a peak formant, and an average zero crossing rate.

In some embodiments, the plurality of media streams include at least one of: a video stream, an audio stream, and a metadata stream.

In one aspect, some embodiments provide a system for determining delay of a plurality of media streams. The system includes a source processor, a destination processor, and an analysis processor. The source processor configured to generate a series of source time packets; and transmit, through a network, the series of source time packets as a source packet stream. Each source time packet includes source time data and source signature data. The source time data corresponds to a first time when the source time packet is generated. The source signature data corresponds to characteristic features of each of the plurality of media streams. The destination processor is configured to generate a series of destination time packets; and transmit, through the network, the series of destination time packets as a destination packet stream. Each destination time packet includes destination time data and destination signature data. The destination time data corresponds to a second time when the destination time packet is generated. The destination signature data corresponds to characteristic features of each of the plurality of media streams. The analysis processor is configured to receive, through the network, the source packet stream and the destination packet stream; determine a transmission time for at least one of the source packet stream and the destination packet stream based on at least one of the source time data and the destination time data; and determine a relative synchronization error based on the source signature data and the destination signature data.

In one aspect, some embodiments provide a method for determining delay of a plurality of media streams. The method involves generating, at a source processor, a series of source time packets; transmitting, at the source processor, through a network, the series of source time packets as a source packet stream; generating, at a destination processor, a series of destination time packets; receiving, at the destination processor, through the network, the source packet stream; determining, at the destination processor, a transmission time for the source packet stream based on the source time data and the destination time data; and determining, at the destination processor, a relative synchronization error based on the source signature data and the destination signature data. Each source time packet includes source time data and source signature data. The source time data corresponds to a first time when the source time packet is generated. The source signature data corresponds to characteristic features of each of the plurality of media streams. Each destination time packet includes destination time data and destination signature data. The destination time data corresponds to a second time when the destination time packet is generated. The destination signature data corresponds to characteristic features of each of the plurality of media streams.

In some embodiments, the source packet stream is transmitted in-band with the plurality of media streams.

In some embodiments, the source packet stream is transmitted out-of-band from the plurality of media streams.

In some embodiments, the source time data and the destination time data is generated using PTP (Precision Time Protocol).

In some embodiments, the source time data and the destination time data further include a clock signal.

In some embodiments, the method further involves transmitting, at the source processor, through the network, the plurality of media streams; processing, at at least one processing device the network, at least one media stream of the plurality of media streams; and receiving, at the destination processor, the plurality of media streams.

In some embodiments, the source packet stream is transmitted synchronously.

In some embodiments, the source packet stream is transmitted asynchronously.

In some embodiments, the characteristic features include at least one of: an average luma value, an average color value, an average motion distance, and a contrast level.

In some embodiments, the characteristic features include at least one of: an envelope of signal amplitude, an average loudness level, a peak formant, and an average zero crossing rate.

In some embodiments, the plurality of media streams include at least one of: a video stream, an audio stream, and a metadata stream.

In one aspect, some embodiments provide a method for determining delay of a plurality of media streams. The method involves generating, at a source processor, a series of source time packets; transmitting, at the source processor, through a network, the series of source time packets as a source packet stream; generating, at a destination processor, a series of destination time packets; transmitting, at the destination processor, through a network, the series of destination time packets as a destination packet stream; receiving, at an analysis processor, through the network, the source packet stream and the destination packet stream; determining, at the analysis processor, a transmission time for at least one of the source packet stream and the destination packet stream based on at least one of the source time data and the destination time data; and determining, at the analysis processor, a relative synchronization error based on the source signature data and the destination signature data. Each source time packet includes source time data and source signature data. The source time data corresponds to a first time when the source time packet is generated. The source signature data corresponds to characteristic features of each of the plurality of media streams. Each destination time packet includes destination time data and destination signature data. The destination time data corresponds to a second time when the destination time packet is generated. The destination signature data corresponds to characteristic features of each of the plurality of media streams.

BRIEF DESCRIPTION OF THE DRAWINGS

Embodiments of the present invention will now be described in detail with reference to the drawings, in which.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y"

is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements. Furthermore, the term "body" typically refers to the body of a patient, a subject or an individual who receives the ingestible device. The patient or subject is generally a human or other animal.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Figure 1:
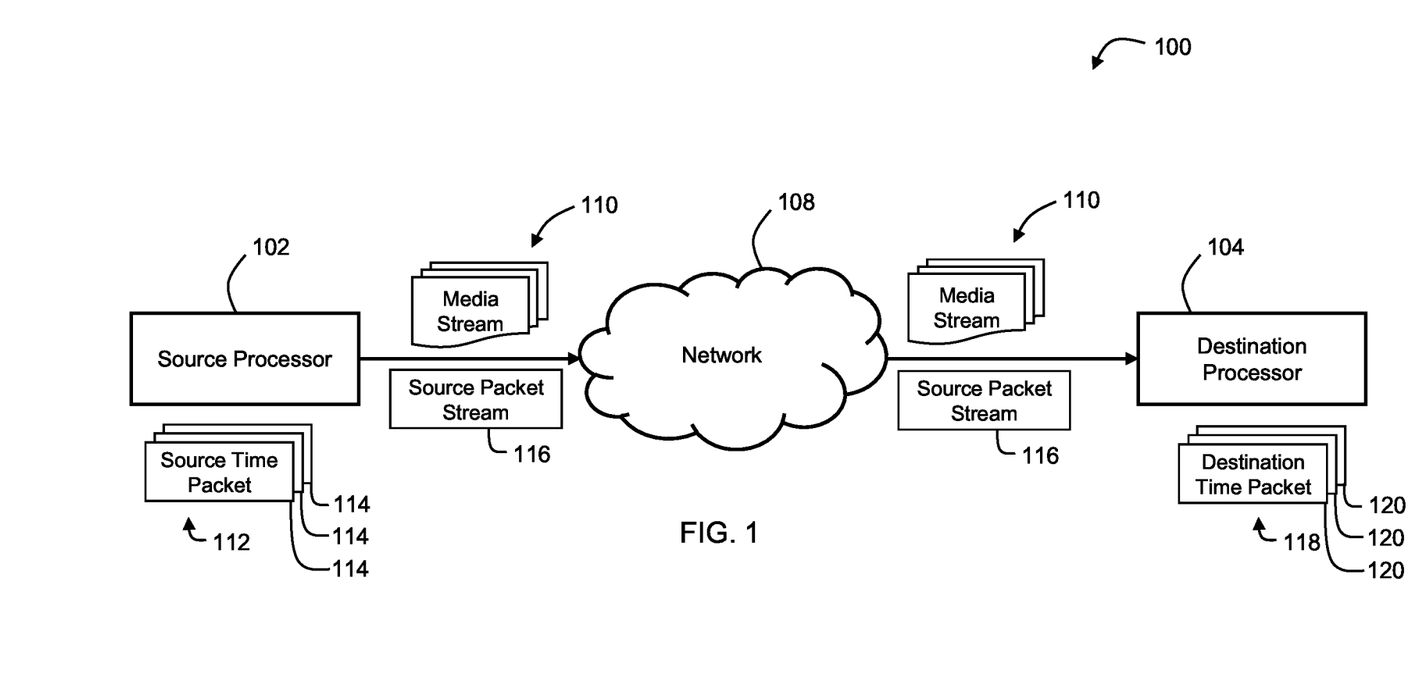
FIG. 1 is a block diagram of a system for determining delay of a plurality of media streams, in accordance with at least one embodiment.

Reference is first made to FIG. 1, which illustrates a block diagram of system 100 for determining delay of a plurality of media streams 110, in accordance with at least one embodiment. System 100 includes source processor 102, destination processor 104, and network 108. Source processor 102 is connected to destination processor 104 via network 108. Various data can be transmitted from source processor 102 to destination processor 104 across network 108.

Source processor 102 and destination processor 104 can be any suitable processors, controllers, digital signal processors, graphics processing units, application specific integrated circuits (ASICs), and/or field programmable gate arrays (FPGAs) that can provide sufficient processing power depending on the configuration, purposes and requirements of the system 100. In some embodiments, source processor 102 and destination processor 104 can include more than one processor with each processor being configured to perform different dedicated tasks.

Source processor 102 can be connected to one or more source devices (not shown) that generate media content. For example, the source devices may be cameras, microphones, or other devices for generating video, audio, or metadata content. Source processor 102 can receive media content from the source devices and generate media streams 110. In some embodiments, source processor 102 can receive media streams 110 from the source devices and does not generate media streams 110. In some embodiments, source processor 102 is a source device. In some embodiments, source processor 102 can be connected to one or more other processing devices (not shown) that transmit media streams 110 to source processor 102.

Each stream of media streams 110 can include video, audio, or metadata content. In some embodiments, each stream includes only one type of content. In other embodiments, each stream can include more than one type of content. A media stream that includes video, audio, or metadata may be referred to as a video stream, audio stream, or metadata stream, respectively. In some embodiments, each stream of media streams 110 is packetized. That is, the data within each stream is formatted as a plurality of packets. Accordingly, each media stream can include a plurality of media packets, each video stream can include a plurality of video packets, each audio stream can include a plurality of audio packets, and each metadata stream can include a plurality of metadata packets. It will be appreciated that although only three media streams 110 are shown, there can be any number of media streams 110.

Source processor 102 can transmit media streams 110 through network 108 to destination processor 104. In some embodiments, media streams 110 are transmitted by source processor 102 using a synchronous communication standard, such as SDI (Serial Digital Interface). In other embodiments, media streams 110 are transmitted using an asynchronous communication standard, such as IP (Internet Protocol). In some cases, media streams 110 are transmitted in a steady stream. In some cases, media streams 110 are transmitted intermittently.

Network 108 can include various network paths (not shown) through which data, such as media streams 110, can be routed. In some embodiments, the network paths can include various switches and intermediate processing devices. The switches can selectively reconfigure one or more network paths to change the routing of media streams 110. For example, the switches can route a stream from the source processor 102, to one or more intermediate processing devices, to the destination processor 104. The intermediate processing devices can process one or more of media streams 110. For example, an intermediate processing device can process a video stream to adjust various characteristics of the video content, such as resolution, color, contrast, brightness, orientation, level of compression, etc. Similarly, an intermediate processing device may process an audio stream to adjust characteristics of the audio content, such as equalization, level of compression, etc. An intermediate processing device may also process a metadata stream to add new metadata, or remove or modify existing metadata.

Destination processor 104 can receive media streams 110 from source processor 102, through network 108. In some embodiments, destination processor 104 can buffer one or more of media streams 110. That is, destination processor 104 can temporarily store data from one or more streams in a memory (not shown). For example, media streams 110 received at different times or at different rates can be buffered by destination processor 104 for later processing.

Destination processor 104 can be connected to one or more downstream devices (not shown). For example, destination processor 104 can be connected to a video production system. Destination processor 104 can transmit media streams 110 to the video production system, which can output media streams 110. For example, a video production system can display video streams on one or more monitors or play audio streams on one or more speakers. In some cases, the video production system can be used to facilitate production of a television broadcast.

In some cases, media streams 110 may be out of sync or temporally misaligned with respect to each other when they are received by destination processor 104. For example, a video stream may be "running ahead" or "running behind" a corresponding audio stream, resulting in lip-sync errors. This may be caused by the fact the media content was generated by different source devices. In some cases, there may be desynchronization even where media content was generated by the same source device. The desynchronization may be caused by media streams 110 traveling on different network paths or having different intermediate processing. As will be discussed in further detail below, system 100 can determine transmission times and relative synchronization errors.

Source processor 102 can generate a series of source time packets 112. It will be appreciated that although only three source time packets 114 are shown, source processor 102 can generate any number of source time packets 114. In some embodiments, source processor 102 can generate a source time packet 114 for each segment of a media stream. For example, for a video stream, the segment may correspond to a video frame. Accordingly, source processor 102 can generate a series of source time packets 112 at the same frequency as a video frame rate of a video stream. In some embodiments, source processor 102 can generate a source time packet 114 for each set of contemporaneous media segments. For example, a set of media segments may include a video frame, an audio segment cotemporaneous with the video frame, and metadata cotemporaneous with the video frame.

Each source time packet includes source time data. Source time data corresponds to the time when the source time packet 114 is generated. For example, source time data can include a timestamp identifying when the source time packet 114 was generated. This time may be referred to as a first time. In some embodiments, each source time packet 114 is generated approximately contemporaneous with the transmission of the source time packet 114. In some embodiments, each source time packet 114 is generated approximately contemporaneous with the transmission of a segment of a media stream or with the transmission of a set of cotemporaneous media segments. Accordingly, in some embodiments, the source time data can correspond to the time when the source time packet 114 or a particular segment of a media stream is transmitted.

In some embodiments, source time data can be generated using a clock which is synchronized throughout system 100. For example, source time data can be generated using PTP (Precision Time Protocol). PTP can ensure that time values determined at the same time by different devices, in possibly different locations, share a common time.

Each source time packet 114 further includes source signature data. Source signature data corresponds to characteristic features of each of media streams 110. The characteristic features can be used to identify a particular segment of a particular stream. For example, for a video stream, the characteristic features may correspond to a particular video frame. For a video stream, the characteristic features may include an average luma value, an average color value, an average motion distance, or a contrast level. Similarly, for an audio stream, the characteristic feature may include an envelope of signal amplitude, an average loudness level, a peak formant, and an average zero crossing rate. For a metadata stream, the characteristic feature may include a hash value of some or all of the metadata. In some embodiments, the characteristic features can correspond to a set of cotemporaneous segments of media streams 110. For example the characteristic features can identify a video frame, an audio segment cotemporaneous with the video frame, and metadata cotemporaneous with the video frame.

In some embodiments, each source time packet 114 can include additional time data, such as a clock signal, to facilitate video network communication. For example, some video transmission standards, such as some SDI standards, require a 90 kHz clock to be embedded with video data, on a frame-by-frame basis. The 90 kHz clock can be embedded in each source time packet 114 to allow each source time packet 114 to be synchronized with each specific video frame.

It will be appreciated that source time packets 114 can be any data structure or collection of the various data items, regardless of whether they are assembled or transmitted in any particular structure. That is, a source time packet 114 may, in some embodiments, never be assembled as a packet or transmitted.

Source processor 102 can transmit the series of source time packets 112 as source packet stream 116 through network 108. Source packet stream 116 can be a packetized stream. That is, source packet stream 116 can include data that is formatted in a plurality of packets. Source packet stream 116 can be transmitted using a synchronous communication standard or an asynchronous communication standard.

Source packet stream 116 can be transmitted out-of-band from media streams 110. That is, source packet stream 116 and media streams 110 are transmitted in separate streams. However, in some embodiments, source packet stream 116 is transmitted in-band with media streams 110. That is, source packet stream 116 and media streams 110 are transmitted in the same stream. In such embodiments, source packet stream 116 travels along the same network path as one or more media streams. For example, source time packets 114 can be transmitted in the same stream as other video, audio, or metadata packets. In another example, source time packets 114 can be embedded in a metadata packet (such as in VANC) in a metadata stream or media stream. In some embodiments, source packet stream 116 can be transmitted to the same IP address as media streams 110, but to a different UDP port number.

Destination processor 104 can receive, through network 108, source packet stream 116 and media streams 110. Destination processor 104 can generate a series of destination time packets 118. In some embodiments, destination processor 104 generates each destination time packet 120 for each segment of a media stream. For example, for a video stream, a segment may correspond to a video frame. In some embodiments, destination processor 104 can generate a source time packet 120 for each set of contemporaneous media segments.

Each destination time packet 120 includes destination time data, similar to source time packets 114 and source time data. Destination time data corresponds to the time when the destination time packet 120 is generated. This time may be referred to as a second time. In some embodiments, each destination time packet 120 is generated approximately contemporaneous with the reception of each source time packet 114. In some embodiments, each destination time packet 120 is generated approximately contemporaneous with the reception of each segment of a media stream or each set of cotemporaneous media segments. In some embodiments, the destination time data is generated using PTP. In some embodiments, the destination time data can include a clock signal.

Each destination time packet 120 also includes destination signature data, similar to source time packets 114 and source signature data. Destination signature data corresponds to characteristic features of each of the media streams 110. The characteristic features can be similar as those described source time packets 114. In some embodiments, the characteristic features can correspond to a set of cotemporaneous segments of media streams 110.

It will be appreciated that destination time packets 120 may refer to any data structure or collection of the various data items, regardless of whether they are assembled or transmitted in any particular structure. That is, a destination time packet 120 may, in some embodiments, never be assembled as a packet or transmitted.

Destination processor 104 can determine a transmission time for the source packet stream 116 based on the source time data and the destination time data. For example, destination processor 104 can determine a difference between a first time when a source time packet is generated and a second time when a destination time packet is generated. The source time packet can be generated contemporaneously with the transmission of source packet stream 116 and the destination time packet can be generated contemporaneously with the reception of source packet stream 116. Accordingly, the difference between the first time and the second time can indicate a transmission time of the source packet stream 116 through network 108. In some cases, the transmission time of the source packet stream 116 can be substantially equal to the transmission time of one or more of media streams 110. For example, this may be the case where source packet stream 116 travels along the same network path as one or more of media streams 110, or where the source time packet is generated approximately cotemporaneous with the transmission of the one or more media stream.

Destination processor 104 can also determine a relative synchronization error for media streams 110. Relative synchronization error can refer to a difference between the delays of two or more media streams. For example, for an audio stream that was delayed 100 ms and a video stream that was delayed 25 ms, the relative synchronization error is 75 ms. That is, the audio stream is running 75 ms behind the video stream. In some cases, the relative synchronization can be based on relative delays of media streams 110. That is, the delays are relative to another time, rather than absolute. For example, the delay of the streams can be relative to the transmission time for the source packet stream 116. That is, the delays are relative to the time when the source packet stream 116 is received by destination processor 104.

Destination processor 104 can determine the relative synchronization error based on the source signature data and the destination signature data. As discussed above, the source signature data and destination signature data can include characteristic features of the media streams that correspond to particular segments of the media stream. Destination processor 104 can compare the source signature data of each source time packet 114 and destination signature data of each destination time packet 120. The comparison can be used by destination processor 104 to locate temporal misalignments or relative synchronization errors between media streams. The comparison of source and destination signature data will be described in further detail below with respect to FIGS. 3A and 3B. In some embodiments, destination processor 104 can then realign media streams 110 to correct for the synchronization error. In some embodiments, destination processor 104 can determine the transmission time for each of media streams 110 based on the transmission time and the relative synchronization error.

Figure 2:
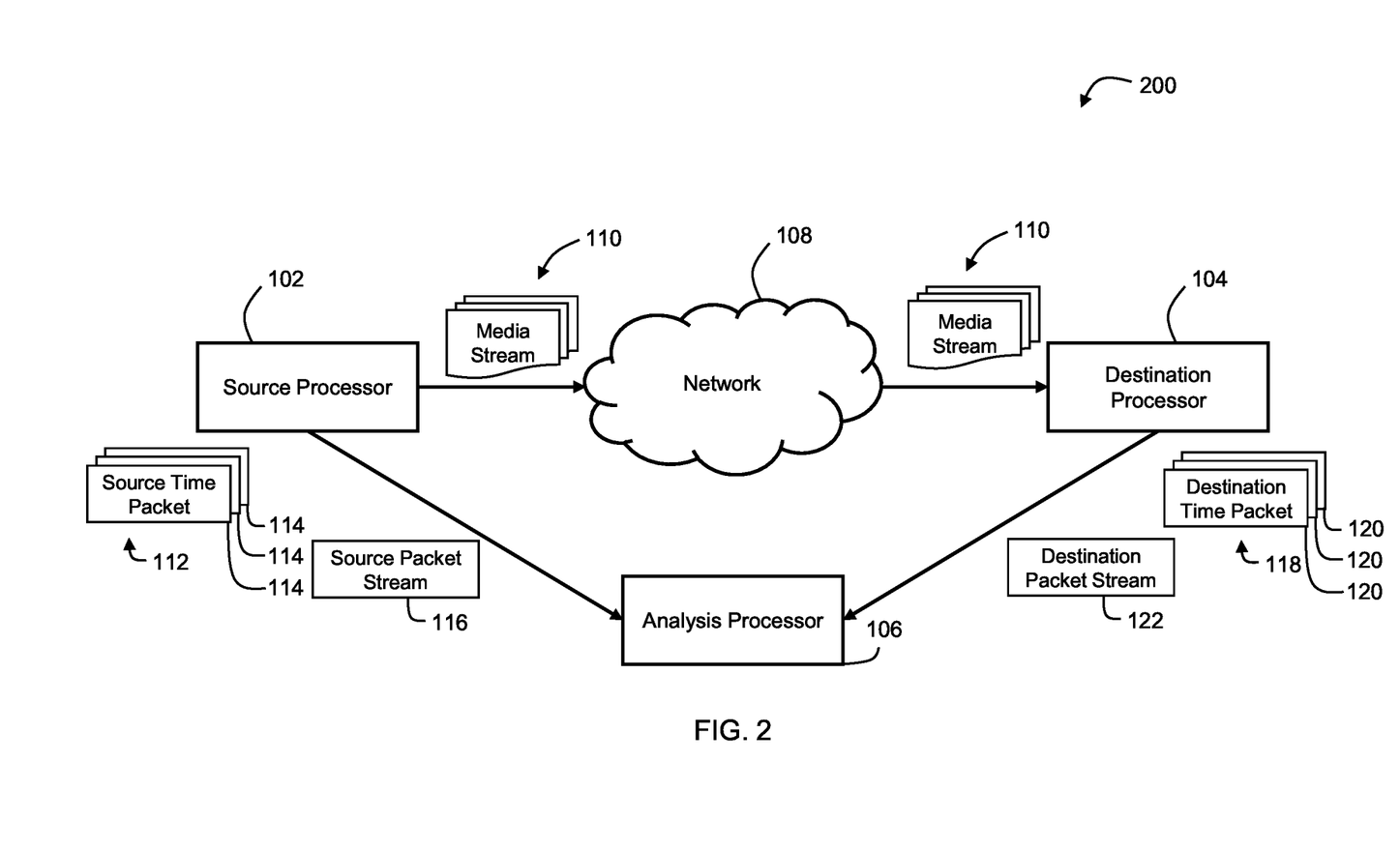
FIG. 2 is a block diagram of a system for determining delay of a plurality of media streams, in accordance with at least one embodiment.

Referring now to FIG. 2, shown therein is a block diagram of system 200 for determining delay of a plurality of media streams, in accordance with at least one embodiment. Similar to system 100 of FIG. 1, system 200 includes source processor 102, destination processor 104, and network 108. However, in contrast to system 100, system 200 further includes analysis processor 106.

Similar to system 100, source processor 102 can transmit media streams 110 through network 108. Source processor 102 can also generate a series of source time packets 112, where each source time packet 114 includes source time data and source signature data. However, in contrast with system 100, source processor 102 transmits the series of source time packets 112 as source packet stream 116 to analysis processor 106 (rather than to destination processor 104). In some embodiments, source processor 102 transmits source packet stream 116 to analysis processor 106 through network 108. In some embodiments, source processor 102 can transmit source packet stream 116 to destination processor 104 and destination processor 104 can transmit source packet stream 116 to analysis processor 106.

Similarly, destination processor 104 can receive media streams 110 through network 108. Destination processor 104 can also generate a series of destination time packets 118, where each destination time packet 120 include source time data and source signature data. However, in contrast to system 100, destination processor 104 transmits the series of destination time packets 118 as destination packet stream 122 to analysis processor 106. In some embodiments, destination processor 104 transmits destination packet stream 122 to analysis processor 106 through network 108.

Analysis processor 106 can be any suitable processors, controllers, digital signal processors, graphics processing units, application specific integrated circuits (ASICs), and/or field programmable gate arrays (FPGAs) that can provide sufficient processing power depending on the configuration, purposes and requirements of the system 200. In some embodiments, analysis processor 106 can include more than one processor with each processor being configured to perform different dedicated tasks.

Analysis processor 106 can receive source packet stream 116 from source processor 102 and receive destination packet stream 122 from destination processor 104. In some embodiments, analysis processor 106 can receive source packet stream 116 and destination packet stream 122 through network 108.

Analysis processor 106 can determine a transmission time for source packet stream 116 based on source time data. For example, analysis processor 106 can compare a first time from the source time data indicating when a source time packet was generated with the time at which the source time packet was received at analysis processor 106. Since the source time packet can be generated approximately contemporaneously with the transmission of source packet stream 116, the difference can correspond to the transmission time of the source time packet. Similarly, analysis processor 106 can also determine a transmission time for destination packet stream 122 based on destination time data.

Analysis processor 106 can also determine a relative synchronization error, based on the source signature data and the destination signature data, in a similar manner as described above with respect to destination processor 106. In some cases, the relative synchronization error is a difference between relative delays of media streams 110, where the delays are relative to the transmission time for source packet stream 116 or destination packet stream 122. In some embodiments, analysis processor 106 can realign media streams 110 to correct for the relative synchronization error. In some embodiments, analysis processor 106 can determine a transmission time for media streams 110 based on the transmission time for source packet stream 116 or destination packet stream 122 and relative synchronization error.

Figure 3A:
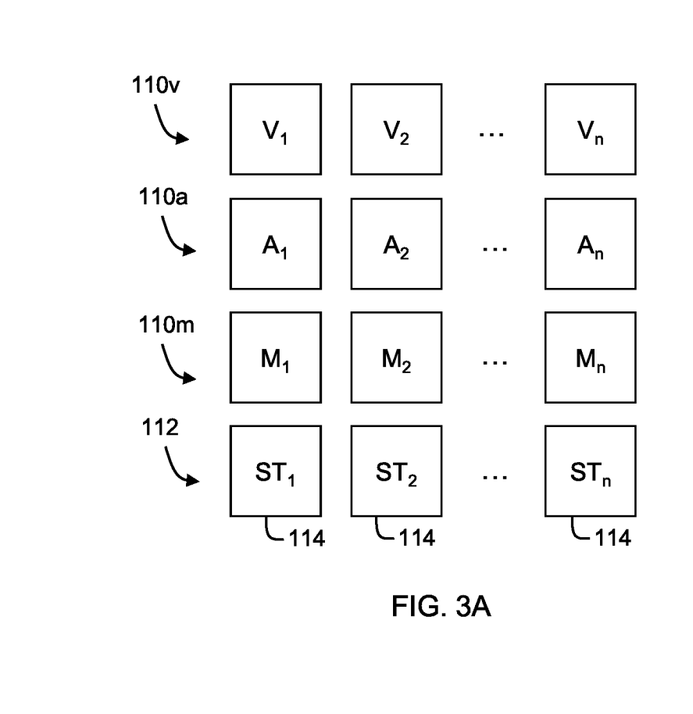
FIGS. 3A and 3B are illustrations of a plurality of media streams, source time packets, and destination time packets, in accordance with at least one embodiment.
Figure 3B:
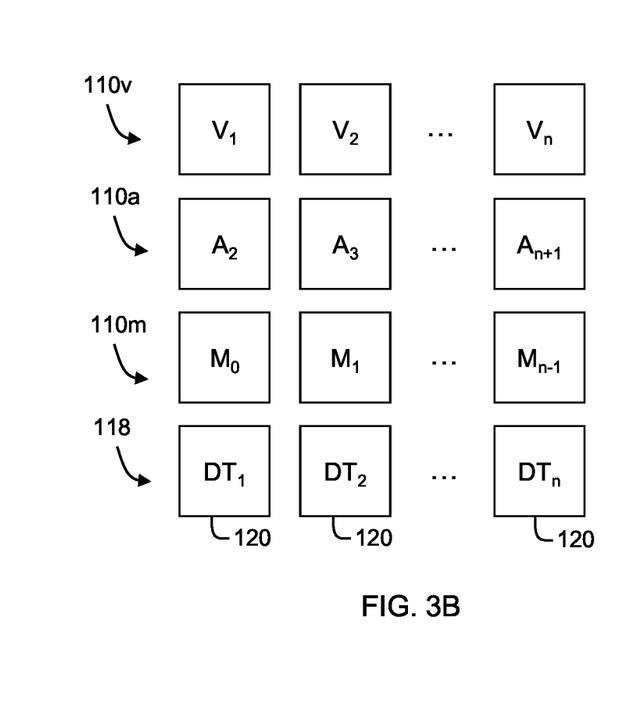

Referring now to FIGS. 3A and 3B, shown therein is an illustration of media streams 110, source time packets 112, and destination time packets 118. Media streams 110 include video stream 110v, audio stream 110a, and metadata stream 110m. Video stream 110v includes video segments $V_1$, $V_2$, ... $V_n$. Similarly, audio stream 110a includes audio segments $A_1$, $A_2$, ... $A_n$ and metadata stream 110m includes metadata segments $M_1$, $M_2$, ... $M_n$. It will be appreciated that although only three media streams are shown, there may be any number of media streams 110.

In FIG. 3A, video stream 110v is aligned temporally with audio stream 110a and metadata stream 110m. For example, $V_1$ can correspond to a video frame, $A_1$ can correspond to audio cotemporaneous to that video frame, and $M_1$ can correspond to metadata cotemporaneous to the video frame. $V_1$ is synchronized with $A_1$ and $M_1$, $V_2$ is synchronized with $A_2$ and $M_2$, and $V_n$ is synchronized with $A_n$ and $M_n$. In this case, there is no difference in delays between video stream 110v, audio stream 110a, and metadata stream 110m. This may be the case, for example, for media streams 110 at source processor 102 of FIGS. 1 and 2.

In some cases, video stream 110v, audio stream 110a, and metadata stream 110m can become misaligned or desynchronized with respect to each other. That is, a difference in delays can develop between one or more of video stream 110v, audio stream 110a, and metadata stream 110m. This may be the case, for example, for the media streams 110 at destination processor 104 of FIGS. 1 and 2. The desynchronization can be caused, for example, when media streams 110 are transmitted through network 108 of FIGS. 1 and 2.

In FIG. 3B, video stream 110v is now no longer synchronized with audio stream 110a and metadata stream 110m. That is, $V_1$ is now cotemporaneous with $A_2$ and $M_0$, instead of $A_1$ and $M_1$; $V_2$ is now cotemporaneous with $A_3$ and $M_1$, instead of $A_2$ and $M_2$; and $V_n$ is cotemporaneous with $A_{n+1}$ and $M_{n-1}$, instead of $A_n$ and $M_n$. There is a difference in delays between video stream 110v, audio stream 110a and metadata stream 110m. Audio stream 110a is "running ahead" of video stream 110v, and metadata stream 110m is "running behind" video stream 110v.

In order to realign or resynchronize media streams 110v, 110a, 110m, a series of source time packets 112 and destination time packets 118 can be used. Source time packets 112 include packets $ST_1$, $ST_2$, ... $ST_n$. Source time packets 112 can be generated, for example, by source processor 102 of FIGS. 1 and 2. A source time packet 114 is generated for each set of cotemporaneous segments of media stream 110v, 110a, 110m. For example, source time packet $ST_1$ is generated for segments $A_1$, and $M_1$; source time packet $ST_2$ is generated for segments $V_2$, $A_2$, and $M_2$; and source time packet $ST_n$ is generated for segments $V_n$, $A_n$, and $M_n$.

Similarly, destination time packets 118 include packets $DT_1$, $DT_2$, ... $DT_n$ and can be generated, for example, by destination processor 104 of FIGS. 1 and 2. A destination time packet 120 is generated for each set of cotemporaneous segments of media stream 110v, 110a, 110m. For example, source time packet $DT_1$ is generated for segments $V_1$, $A_2$, and $M_0$; source time packet $DT_2$ is generated for segments $V_2$, $A_3$, and $M_1$; and source time packet $DT_n$ is generated for segments $V_n$, $A_{n+1}$, and $M_{n-1}$.

Each source time packet $ST_1$, $ST_2$, ... $ST_n$ includes signature data that corresponds to characteristic features of media streams 110v, 110a, 110m. The characteristic features correspond to the respective segments of media streams 110v, 110a, 110m. For example, source time packet $ST_1$ includes signature data corresponding to a characteristic feature of video segment $V_1$, audio segment $A_1$, and metadata segment $A_1$. Similarly, source time packet $ST_2$ includes signature data corresponding to $V_2$, $A_2$, and $M_2$, and source time packet $ST_n$ includes signature data corresponding to $V_n$, $A_n$, and $M_n$.

Each destination time packet $DT_1$, $DT_2$, ... $DT_n$ also includes signature data that corresponds to characteristic features of media streams 110v, 110a, 110m. The characteristic features correspond to the respective segments of media streams 110v, 110a, 110m. For example, destination time packet $DT_1$ includes signature data corresponding to characteristic feature of video segment $V_1$, audio segment $A_2$, and metadata segment $M_0$. Similarly, source time packet $DT_2$ includes signature data corresponding to $V_2$, $A_3$, and $M_1$ and source time packet $DT_n$ includes signature data corresponding to media segments $V_n$, $A_{n+1}$, and $M_{n-1}$.

The signature data of source time packets 112 and destination time packets 118 can be compared to determine a relative synchronization error of media streams 110v, 110a, 110m. For example, the signature data of source time packet $ST_1$ indicates that segment $V_1$ should be aligned temporally with segments $A_1$ and $M_1$. However, the signature data of destination time packet $DT_1$ indicates that segment $V_1$ is aligned temporally with segments $A_2$ and $M_0$. Accordingly, a difference in relative delays between video stream 110v and audio stream 110a can be determined based on $A_1$ and $A_2$. Similarly, a relative synchronization error between video stream 110v and metadata stream 110m can be determined based on $M_0$ and $M_1$. Based on the relative synchronization error, media streams 110v, 110a, and 110m can be realigned or resynchronized, so that $V_1$ is synchronized with $A_1$ and $M_1$, $V_2$ is synchronized with $A_2$ and $M_2$, and $V_n$ is synchronized with $A_n$ and $M_n$.

In some cases, the signature data of source time packets 112 and destination time packets 118 may be compared using cross-correlation. For example, in some cases, the signature data of a source time packet may not be identical with the signature data of a destination time packet. This may be the case when intermediate processing is performed on the media streams 110v, 110a, 110m. In such cases, the signature data of source time packets 112 and destination time packets 118 may be cross-correlated to determine relative synchronization errors.

Figure 4:
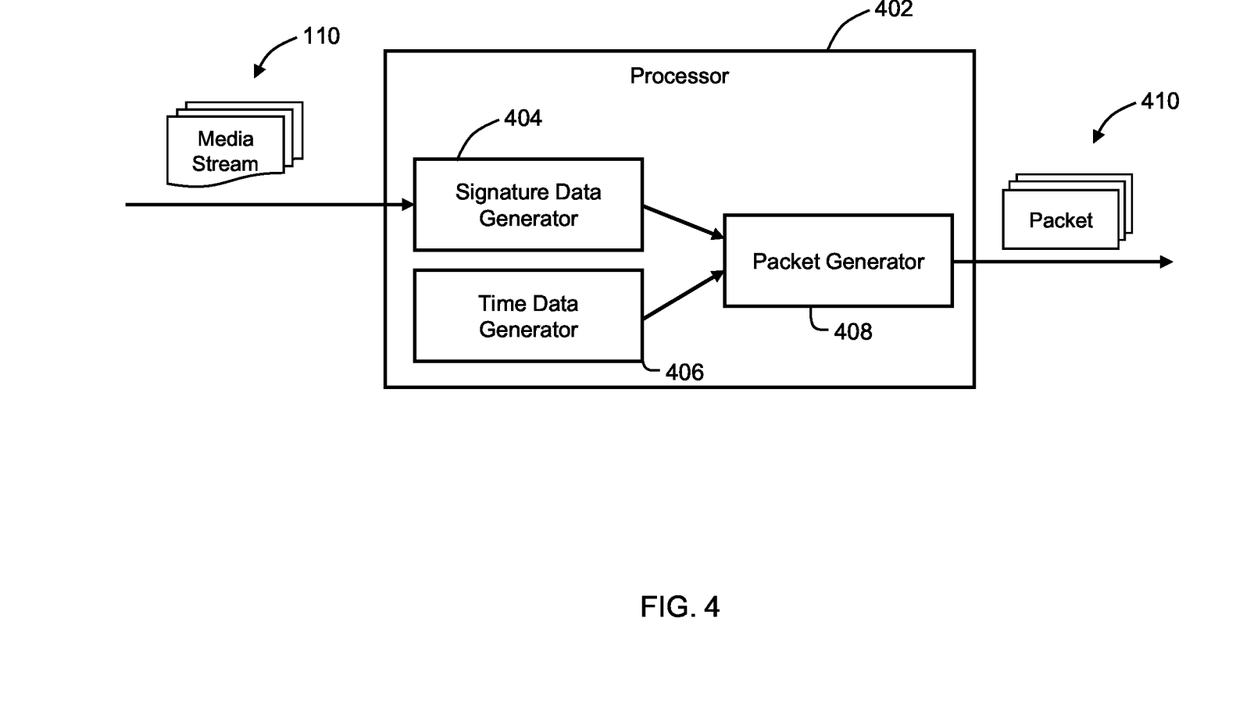
FIG. 4 is a block diagram of a processor, in accordance with at least one embodiment.

Referring now to FIG. 4, shown therein is a block diagram of a processor 402 for determining delay of a plurality of media streams, in accordance with at least one embodiment. For example, Processor 402 may be source processor 102 or destination processor 104 of system 100 or system 200. Processor 402 includes signature data generator 404, time data generator 406, and packet generator 408.

Processor 402 can be any suitable processors, controllers, digital signal processors, graphics processing units, application specific integrated circuits (ASICs), and/or field programmable gate arrays (FPGAs) that can provide sufficient processing power depending on the configuration, purposes and requirements of the system. In some embodiments, processor 402 can include more than one processor with each processor being configured to perform different dedicated tasks.

Signature data generator 402 can receive media streams 110. In some embodiments, processor 402 receives source signals (not shown) and generates media streams 110 that are received by signature data generator 402. Signature generator 402 can generate signature data based on media streams 110. As discussed above, signature data corresponds to characteristic features of each of media streams 110.

Time data generator 406 can generate time data. The time data corresponds to a time when a packet of packets 410 is generated. In some embodiments, packets 410 are generated approximately contemporaneous with the transmission of packets 410 or media streams 110. In some cases, the time data can also include a clock signal.

Packet generator 408 can generate packets 410 that include the signature data and time data. For example, packet generator 408 can generate source time packets 112 and destination time packets 118 of systems 100 and 200. It will be appreciated that packets 410 can any data structure or collection of the various data items, regardless of whether they are assembled or transmitted in any particular structure. That is, packets 410 may, in some embodiments, never be assembled as a packet or transmitted.

Processor 402 can then transmit the generated packets 410 as a packet stream (not shown). For example, processor can transmit the source packet stream 116 or the destination packet stream 122 of FIGS. 1 and 2. Processor 402 can also transmit the media streams 110.

Figure 5:
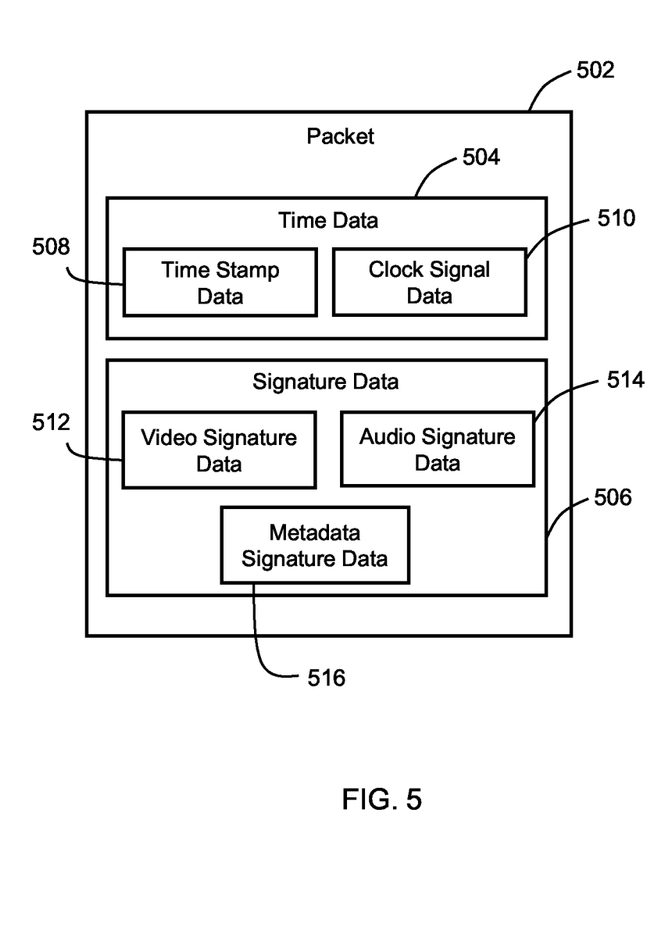
FIG. 5 is a block diagram of a packet, in accordance with at least one embodiment.

Referring now to FIG. 5, shown therein is a block diagram of a packet 502, in accordance with at least one embodiment. Packet 502 includes time data 504 and signature data 506. For example, packet 502 may be a source time packet 114 or a destination time packet 118 of system 100 or system 200. It will be appreciated that packet 502 can any data structure or collection of the various data items, regardless of whether they are assembled or transmitted in any particular structure. That is, packet 502 may, in some embodiments, never be assembled as a packet or transmitted.

Time data 504 includes time stamp data 508 and clock signal data 510. Time stamp data 508 can include data indicating a time when packet 502 was generated. In some cases, packet 502 is generated approximately contemporaneous with its transmission. Clock signal data 510 can include data required by certain video transmissions standards, such as a 90 kHz clock.

Signature data 506 includes video signature data 512, audio signature data 514, and metadata signature data 516. Signature data can include characteristic features of particular segments of one or more media streams.

Figure 6:
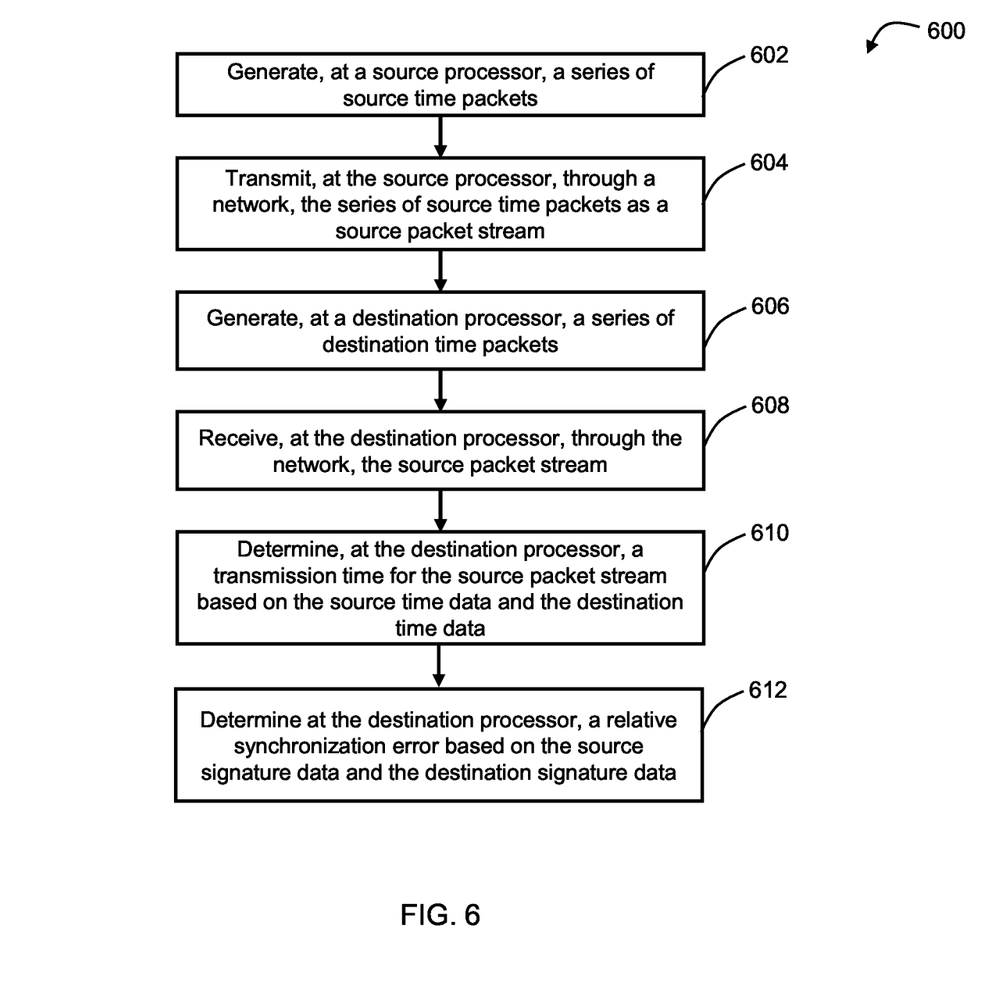
FIG. 6 is a flowchart of a method for determining delay of a plurality of media streams, in accordance with at least one embodiment.

Referring now to FIG. 6, shown therein is a flowchart of a method 600 for determining delay of a plurality of media streams, in accordance with at least one embodiment. For example, method 600 can be implemented using source processor 102, destination processor 104, and network 108 of system 100. Method 600 begins with generating, at a source processor, a series of source time packets at 602. For example, source processor 104 can generate a series of source time packets 112. Each source time packet includes source time data and source signature data. The source time data corresponds to a first time when the source time packet is generated. The source signature data corresponds to characteristic features of each of the plurality of media streams.

At 604, the series of source time packets is transmitted, at the source processor, as a source packet stream through a network. For example, the series of source time packets 112 can be transmitted as source packet stream 116 by source processor 102 through network 108.

At 606, a series of destination time packets is generated at a destination processor. For example, destination processor 104 can generate a series of destination time packets 112. Each destination time packet includes destination time data and destination signature data. The destination time data corresponds to a second time when the destination time packet is generated. The destination signature data corresponds to characteristic features of each of the plurality of media streams.

At 608, the source packet stream is received, at the destination processor, through the network. For example, destination processor 104 can receive source packet stream 116.

At 610, a transmission time for the source packet stream is determined, at the destination processor, based on the source time data and the destination time data. For example, destination processor 104 can determine a transmission time for source packet stream 116 based on source time data and destination time data.

At 612, a relative synchronization error is determined, at the destination processor, based on the source signature data and the destination signature data. For example, destination processor 104 can determine a synchronization error based on the source signature data and the destination signature data.

Figure 7:
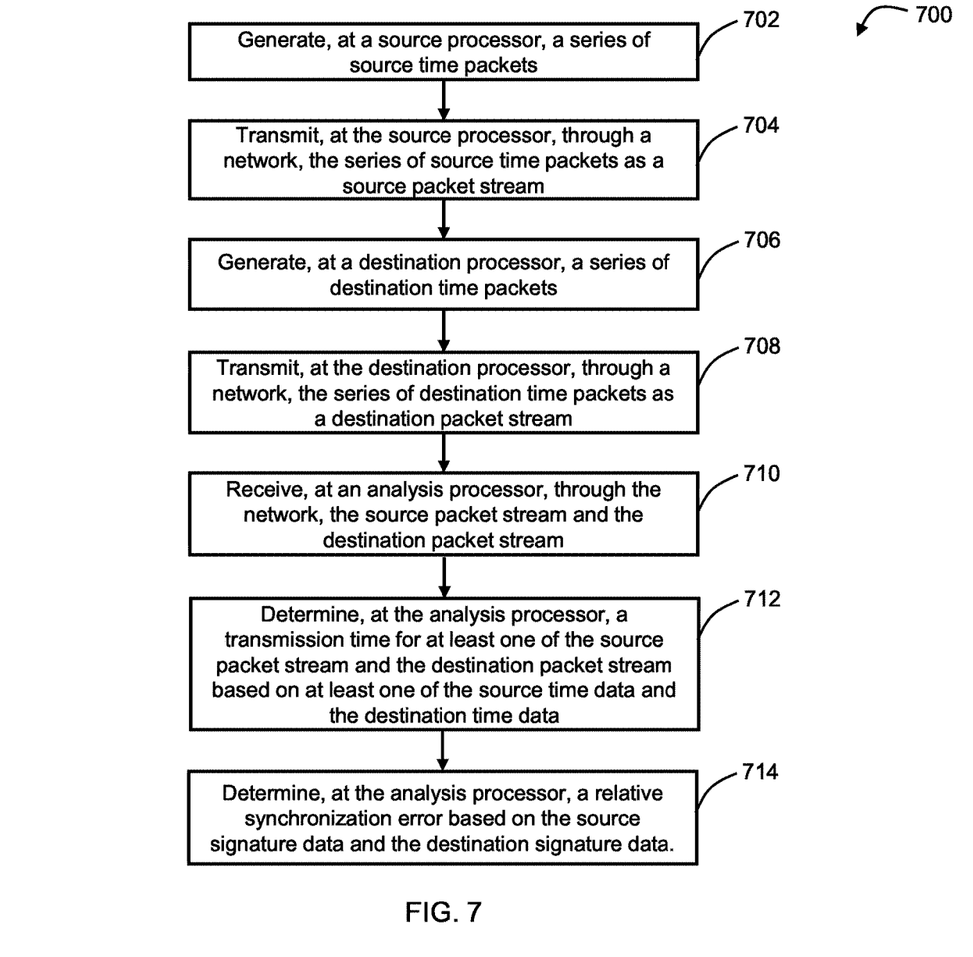
FIG. 7 is a flowchart of a method for determining delay of a plurality of media streams, in accordance with at least one embodiment.

Referring now to FIG. 6, shown therein is a flowchart of a method 700 for determining delay of a plurality of media streams, in accordance with at least one embodiment. For example, method 700 can be implemented using source processor 102, destination processor 104, analysis processor 106, and network 108 of system 200. Method 700 begins with generating, at a source processor, a series of source time packets at 702. For example, source processor 102 can generate a series of source time packets 112. Each source time packet includes source time data and source signature data. The source time data corresponds to a first time when the source time packet is generated. The source signature data corresponds to characteristic features of each of the plurality of media streams.

At 704, the series of source time packets is transmitted, at the source processor, as a source packet stream through a network. For example, source processor 102 can transmit source time packets 112 as source packet stream 116.

At 706, a series of destination time packets is generated at a destination processor. For example, destination processor 104 can generate a series of destination time packets 118. Each destination time packet includes destination time data and destination signature data. The destination time data corresponds to a second time when the destination time packet is generated. The destination signature data corresponds to characteristic features of each of the plurality of media streams.

At 708, the series of destination time packets is transmitted, at the destination processor, as a destination packet stream through the network. For example, destination processor 104 can transmit destination time packets 118 as destination packet stream 122.

At 710, the analysis processor receives the source packet stream and the destination packet stream. For example, analysis processor 106 can receive source packet stream 116 and destination packet stream 122.

At 712, the analysis processor determines a transmission time for at least one of the source packet stream and the destination packet stream based on at least one of the source time data and the destination time data. For example, analysis processor 106 can determine the transmission time for at least one of source packet stream 116 and destination packet stream 122.

At 714, the analysis processor determines a relative synchronization error based on the source signature data and the destination signature data. For example, analysis processor 106 can determine a relative synchronization error.

The present invention has been described here by way of example only. Various modification and variations may be made to these exemplary embodiments without departing from the spirit and scope of the invention, which is limited only by the appended claims.

We claim:

1. A system for determining delay of a plurality of media streams comprising:
   a source processor configured to:
     generate a series of source time packets, each source time packet including source time data and source signature data, wherein:
       the source time data corresponds to a first time when the source time packet is generated;
       the source signature data corresponds to characteristic features of each of the plurality of media streams;
     transmit, through a network, the series of source time packets as a source packet stream;
   a destination processor configured to:
     generate a series of destination time packets, each destination time packet including destination time data and destination signature data, wherein:
       the destination time data corresponds to a second time when the destination time packet is generated;
       the destination signature data corresponds to characteristic features of each of the plurality of media streams;
     receive, through the network, the source packet stream;
     determine a transmission time for the source packet stream based on the source time data and the destination time data;
     determine a relative synchronization error based on the source signature data and the destination signature data.

2. The system of claim 1, wherein the source packet stream is transmitted in-band with the plurality of media streams.

3. The system of claim 1, wherein the source packet stream is transmitted out-of-band from the plurality of media streams.

4. The system of claim 1, wherein the source time data and the destination time data is generated using PTP (Precision Time Protocol).

5. The system of claim 1, wherein:
   the source processor is further configured to transmit, through the network, the plurality of media streams;
   the network comprises at least one processing device configured to process at least one media stream of the plurality of media streams; and
   the destination processor is further configured to receive the plurality of media streams.

6. The system of claim 1, wherein the source time data and the destination time data further include a clock signal.

7. The system of claim 1, wherein the source packet stream is transmitted synchronously.

8. The system of claim 1, wherein the source packet stream is transmitted asynchronously.

9. The system of claim 1, wherein the characteristic features include at least one of: an average luma value, an average color value, an average motion distance, and a contrast level.

10. The system of claim 1, wherein the characteristic features include at least one of: an envelope of signal amplitude, an average loudness level, a peak formant, and an average zero crossing rate.

11. The system of claim 1, wherein the plurality of media streams include at least one of: a video stream, an audio stream, and a metadata stream.

12. A system for determining delay of a plurality of media streams comprising:
   a source processor configured to: generate a series of source time packets, each source time packet including source time data and source signature data, wherein: the source time data corresponds to a first time when the source time packet is generated; the source signature data corresponds to characteristic features of each of the plurality of media streams; transmit, through a network, the series of source time packets as a source packet stream;
   a destination processor configured to: generate a series of destination time packets, each destination time packet including destination time data and destination signature data, wherein: the destination time data corresponds to a second time when the destination time packet is generated; the destination signature data corresponds to characteristic features of each of the plurality of media streams; transmit, through the network, the series of destination time packets as a destination packet stream;
   an analysis processor configured to: receive, through the network, the source packet stream and the destination packet stream; determine a transmission time for the source packet stream and the destination packet stream based on the source time data and the destination time data;
   determine a relative synchronization error based on the source signature data and the destination signature data.

13. A method for determining delay of a plurality of media streams comprising:

generating, at a source processor, a series of source time packets, each source time packet including source time data and source signature data, wherein:
- the source time data corresponds to a first time when the source time packet is generated;
- the source signature data corresponds to characteristic features of each of the plurality of media streams;

transmitting, at the source processor, through a network, the series of source time packets as a source packet stream;

generating, at a destination processor, a series of destination time packets, each destination time packet including destination time data and destination signature data, wherein:
- the destination time data corresponds to a second time when the destination time packet is generated;
- the destination signature data corresponds to characteristic features of each of the plurality of media streams;

receiving, at the destination processor, through the network, the source packet stream;

determining, at the destination processor, a transmission time for the source packet stream based on the source time data and the destination time data; and determining, at the destination processor, a relative synchronization error based on the source signature data and the destination signature data.

14. The method of claim 13, wherein the source packet stream is transmitted in-band with the plurality of media streams.

15. The method of claim 13, wherein the source packet stream is transmitted out-of-band from the plurality of media streams.

16. The method of claim 13, wherein the source time data and the destination time data is generated using PTP (Precision Time Protocol).

17. The method of claim 13, wherein the source time data and the destination time data further include a clock signal.

18. The method of claim 13, further comprising:
- transmitting, at the source processor, through the network, the plurality of media streams;
- processing, at at least one processing device of the network, at least one media stream of the plurality of media streams; and
- receiving, at the destination processor, the plurality of media streams.

19. The method of claim 13, wherein the source packet stream is transmitted synchronously.

20. The method of claim 13, wherein the source packet stream is transmitted asynchronously.

21. The method of claim 13, wherein the characteristic features include at least one of: an average luma value, an average color value, an average motion distance, and a contrast level.

22. The method of claim 13, wherein the characteristic features include at least one of: an envelope of signal amplitude, an average loudness level, a peak formant, and an average zero crossing rate.

23. The method of claim 13, wherein the plurality of media streams include at least one of: a video stream, an audio stream, and a metadata stream.

24. A method for determining delay of a plurality of media streams comprising:
- generating, at a source processor, a series of source time packets, each source time packet including source time data and source signature data, wherein: the source time data corresponds to a first time when the source time packet is generated; the source signature data corresponds to characteristic features of each of the plurality of media streams; transmitting, at the source processor, through a network, the series of source time packets as a source packet stream;
- generating, at a destination processor, a series of destination time packets, each destination time packet including destination time data and destination signature data, wherein: the destination time data corresponds to a second time when the destination time packet is generated; the destination signature data corresponds to characteristic features of each of the plurality of media streams; transmitting, at the destination processor, through a network, the series of destination time packets as a destination packet stream; receiving, at an analysis processor, through the network, the source packet stream and the destination packet stream;
- determining, at the analysis processor, a transmission time for the source packet stream and the destination packet stream based on the source time data and the destination time data; and determining, at the analysis processor, a relative synchronization error based on the source signature data and the destination signature data.

* * * * *